US005968101A

United States Patent [19]

Schleupen et al.

[11] Patent Number: 5,968,101

[45] Date of Patent: Oct. 19, 1999

[54] DEVICE FOR RECORDING, STORING, AND OUTPUTTING OF DATA OF A CONTROL UNIT IN A MOTOR VEHICLE

[75] Inventors: Richard Schleupen, Ingersheim; Juergen Zimmermann, Vaihingen, both of Germany

[73] Assignee: Robert Bosch GmbH, Stuttgart, Germany

[21] Appl. No.: 08/636,360

[22] Filed: Apr. 23, 1996

[30] Foreign Application Priority Data

May 5, 1995 [DE] Germany .......................... 195 16 481

[51] Int. Cl.[6] .............................. G06F 7/00; G06F 19/00

[52] U.S. Cl. ................................ 701/35; 701/29; 701/31; 701/34

[58] Field of Search ................................ 701/29, 30, 34, 701/31, 35, 120; 340/438, 439; 73/117.3, 118.1; 374/101, 103; 364/571.03, 557

[56] References Cited

U.S. PATENT DOCUMENTS

| | | | |
|---|---|---|---|
| 4,067,061 | 1/1978 | Juhasz | 701/29 |
| 4,495,500 | 1/1985 | Vickers | 701/207 |
| 4,939,652 | 7/1990 | Steiner | 701/35 |
| 5,018,069 | 5/1991 | Pettigrew | 701/35 |

FOREIGN PATENT DOCUMENTS

| | | |
|---|---|---|
| 36 09 428 | 9/1987 | Germany . |
| 40 38 972 | 11/1991 | Germany . |

*Primary Examiner*—William A. Cuchlinski, Jr.
*Assistant Examiner*—Gertrude Arthur
*Attorney, Agent, or Firm*—Kenyon & Kenyon

[57] ABSTRACT

A device for the recording, storing and outputting of data of a control unit in a motor vehicle, besides the operating time of the control unit, makes it possible for other data to be acquired and stored as well, so that information will be provided regarding the probability of failure or the future reliability of the control unit. Noteworthy as these additional data is at least one of the quantities:

maximum control-unit temperature duration of a control-unit temperature above a certain value minimum control-unit temperature duration of a control-unit temperature below a certain value maximum value of the voltage on the supply-voltage line length of time a supply voltage is applied above a certain value duration and intensity of interference voltages on control-unit lines.

15 Claims, 2 Drawing Sheets

DEVICE FOR RECORDING, STORING, AND OUTPUTTING OF DATA OF A CONTROL UNIT IN A MOTOR VEHICLE

BACKGROUND INFORMATION

German Patent Application No. 36 09 428 is directed to "A Method and a Device for Testing Devices of a Motor Vehicle for a Fault-Free Condition". It concerns the detecting and storing of faults, both with respect to the input and output signals, as well as to the internal signal processing of a control unit, and the outputting of the same in response to a request signal. Specifically, the memory, into which possible fault signals are written, is queried on a block by block basis in response to a request signal and, moreover, there is a ranking of the faults when they are output to the display.

German Patent Application No. 40 38 972 is directed to a "Device for Computing a Motor-Vehicle Service Interval". It provides for various operational values to be recorded, such as number of starts, crankshaft revolutions, driving and parking times, engine temperature, engine oil pressure and the like, and for the service interval to be calculated from the values by a computer. This makes it possible for the driver to specify a service interval that is oriented to the specific operating conditions of the vehicle, so that he or she will be signaled when there is an actual need to have the vehicle serviced.

Finally, U.S. Pat. No. 4,939,652 relates to a "trip recorder", which makes it possible to indicate operational data to the driver, to record the data and, subsequently, to process them in an "off-line computer". This trip recorder must be a type of "black box", as is also provided in airplanes to protect data in the event of a crash.

A considerable cost factor is entailed by motor-vehicle control units. For that reason, efforts have often been made to increase their reliability and to reduce their probability of failure. However, because of the per se rough operation of a motor vehicle, mechanical, electrical, and external thermal influences constitute a certain potential for danger to a control unit. Therefore, an object of the present invention is to create a device which will allow statements to be made regarding the failure probability or the future reliability of a control unit.

SUMMARY OF THE INVENTION

The device according to the present invention (which may constitute a part of a control unit) for recording, storing and outputting data of the control unit in a motor vehicle makes it possible for important data pertaining to the history of a control unit to be recorded, stored and, when needed, output and, thus, for example, for clues to be given when assessing a used control unit with respect to failure probability and reliability.

DETAILED DESCRIPTION

Figure 1:
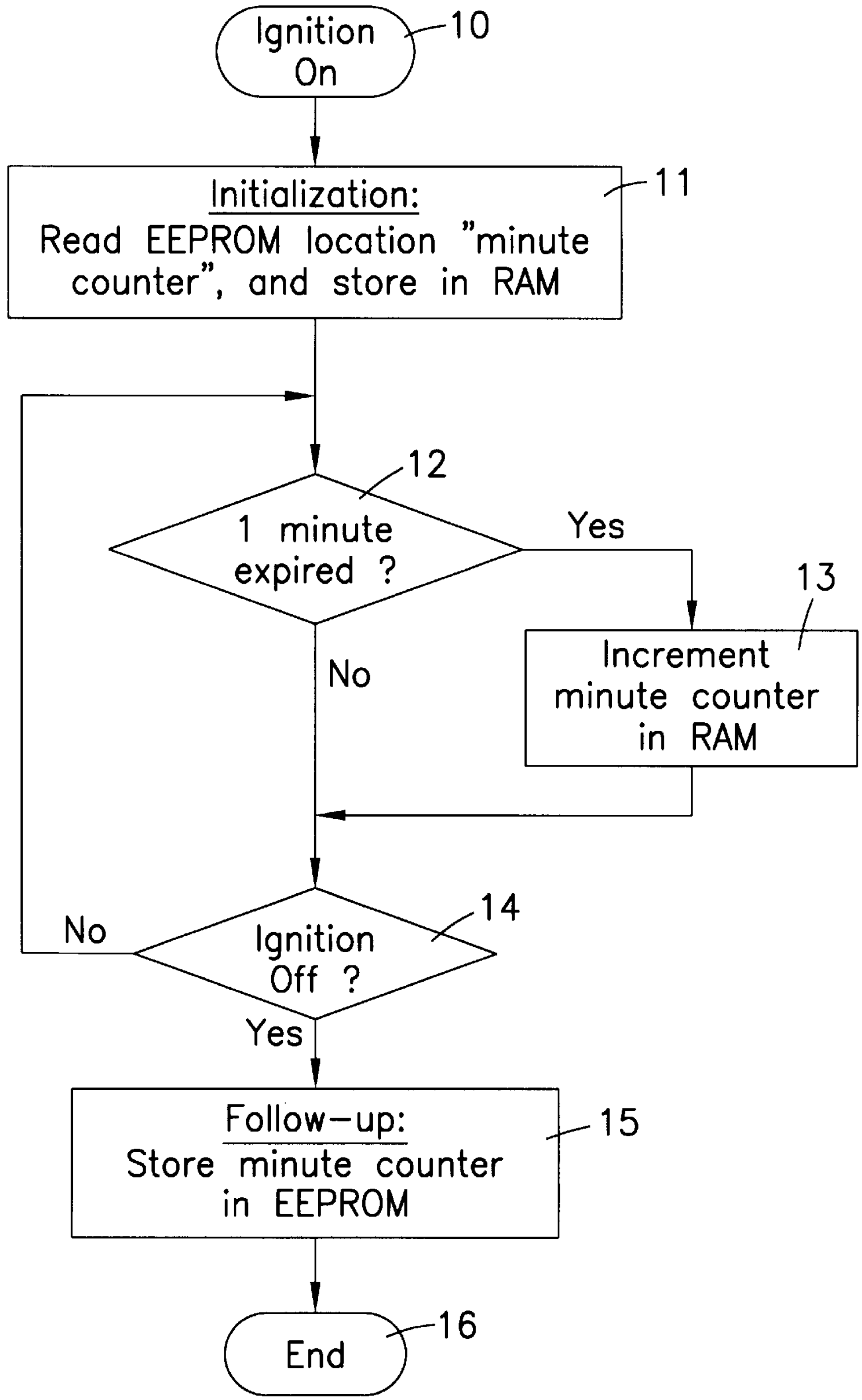
FIG. 1 shows an example of a flow chart for measuring the operating time of the control unit.

The exemplary embodiments refer to program routines in connection with engine control units. Engine control units of this type have counted for quite some time among the state of the art, the storing of operational data also having been provided for. Besides measuring the preceding operating time, which is considered as consequential for the reliability of the control unit, at least one additional quantity is recorded within the scope of the present invention. FIG. 1 described in the following deals with the measurement of the operating time, and FIG. 2 the measurement of the maximum temperature for a control unit. It is emphasized that these two performance quantities are representative of other possible quantities which influence the reliability of the control unit.

In FIG. 1, 10 represents the event of an ignition switch actuation. An initialization follows in block 11 in that the EEPROM location "minute counter" is read and the content is stored in a RAM. A query 12 follows in the specific example, interrogating whether the time duration of one minute has expired. If so, the minute counter is then incremented in the RAM (block 13). If the query unit 12 has not yet established that the one minute has expired, the signal path then continues to a query unit 14 where the determination is made whether the ignition switch has been switched off in the meantime. If not, the cycle begins anew with the query interrogating whether the time duration of one minute has expired (query unit 12). However, if the query unit 14 determines that the ignition has been switched off, it then follows in block 15 within the scope of a per se known tracking of the control unit that the content of the minute counter (see block 13) is stored in the EEPROM. After this storing operation is completed, the end 16 of this program run follows.

Thus, the subject matter of FIG. 1 represents a measuring device for the operating time of the control unit, the smallest measuring interval lasting one minute in the specific case. Of course, this measuring interval can be adapted to the specific requirements of an individual case.

Figure 2:
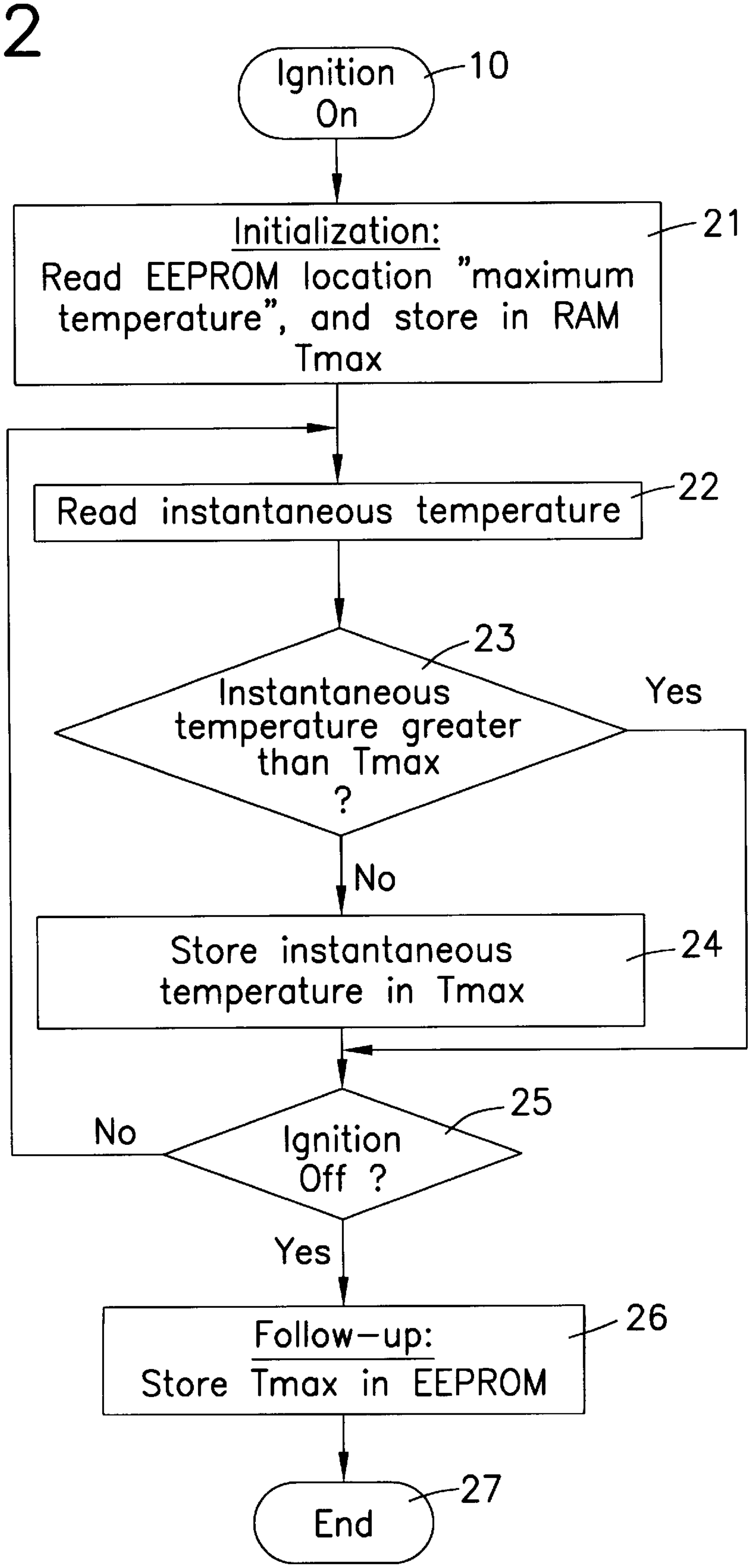
FIG. 2 shows an example of a flow chart for measuring the maximum temperature of the control unit.

FIG. 2 depicts a flow chart for the software-based determination of the maximum temperature to which the control unit has been exposed. This turns out to be expedient because the fact that a control unit was exposed to a high temperature makes it possible for conclusions to be drawn about a future failure probability.

Within the scope of the measurement of the maximum temperature, the control unit begins a subroutine again on the basis of the fact of the ignition (10) being switched on. An initialization follows in block 21 in that the stored value is retrieved from an EEPROM location "maximum temperature" and accepted in a RAM location "Tmax". The instantaneous temperature of the control unit recorded using measuring techniques is read into the program block 22. A query unit 23 follows, in which it is determined whether the instantaneous temperature is greater than the already stored maximum temperature Tmax. If this is the case, in the following block 24, the instantaneous temperature is stored in the RAM memory location "Tmax". Subsequently, and also when the instantaneous temperature was not greater than the already stored maximum temperature Tmax, a query (query unit 25) follows, in turn, to determine the setting of the ignition switch. For as long as the ignition switch has not been switched off, the program run begins once more with block 22 (read in instantaneous temperature). Otherwise, within the scope of the follow-up phase 26, the temperature stored in the RAM location "Tmax" is accepted and stored in the permanent memory (EEPROM), and the program run is completed in 27.

The flow chart of a subroutine illustrated in FIG. 2 makes it possible, within the scope of the engine control unit, to determine the maximum temperature that the control unit was exposed to in the preceding operating phases and to hold it ready for interrogations.

In place of or in addition to the measurement of the maximum temperature of the control unit, it is also possible for a minimum control-unit temperature to be detected, the query not being made then in block 23 of FIG. 2 as to whether the instantaneous temperature is greater than Tmax, but rather less than Tmin.

By combining the programs of FIG. 1 and FIG. 2, it is also possible to determine the duration of a control-unit temperature above and/or below a specific value. For this purpose, a time counter conceived in terms of software, such as that of FIG. 1, would then have to be provided after block 24 of FIG. 2.

By making a simple modification to the flow chart of FIG. 2, it is likewise possible to detect the maximum value of the voltage on the supply-voltage line or, however, the length of time that a supply voltage is applied above a certain value. Correspondingly, the length of time that a supply voltage is applied above a certain value or the duration and also the intensity of interference voltages on control unit lines can also be determined.

The essential part of the present invention is to acquire data pertaining to those performance quantities which can have an effect on the failure probability or on the future reliability of the control unit.

What is claimed is:

1. A device comprising:

a control unit in a motor vehicle, the control unit measuring, storing and outputting data, the data including an operating time of the control unit and at least one additional piece of data indicative of an operating performance of the control unit, the data being indicative of at least one of a probability of failure and a future reliability of the control unit.

2. The device according to claim 1, wherein the additional piece of data includes a temperature of the control unit.

3. The device according to claim 1, wherein the additional piece of data includes at least one of:

a maximum temperature of the control unit; and a duration of time for which a temperature of the control unit is greater than the maximum temperature.

4. The device according to claim 1, wherein the additional piece of data includes at least one of:

a minimum temperature of the control unit; and a duration of time for which a temperature of the control unit is less than the minimum temperature.

5. The device according to claim 1, wherein the additional piece of data includes at least one of:

a maximum voltage on a supply line coupled to the control unit;

a length of time for which a supply voltage applied on the supply line is greater than the maximum voltage; and a duration and intensity of interference voltages on at least one additional line coupled to the control unit.

6. A device comprising:

a control unit in a motor vehicle, the motor vehicle including an ignition, the control unit measuring, storing and outputting data, the data including an operating time of the control unit and at least one additional piece of data indicative of an operating performance of the control unit, the data being indicative of at least one of a probability of failure and a future reliability of the control unit;

wherein the operating time of the control unit is indicative of an entire time that the control unit has operated in the motor vehicle.

7. The device according to claim 6, wherein the additional piece of data includes a temperature of the control unit.

8. The device according to claim 6, wherein the additional piece of data includes at least one of:

a maximum temperature of the control unit; and a duration of time for which a temperature of the control unit is greater than the maximum temperature.

9. The device according to claim 6, wherein the additional piece of data includes at least one of:

a minimum temperature of the control unit; and a duration of time for which a temperature of the control unit is less than the minimum temperature.

10. The device according to claim 6, wherein the additional piece of data includes at least one of:

a maximum voltage on a supply line coupled to the control unit;

a length of time for which a supply voltage applied on the supply line is greater than the maximum voltage; and a duration and intensity of interference voltages on at least one additional line coupled to the control unit.

11. The device according to claim 6, further comprising a counter for storing the operating time of the control unit, the counter being updated each time the ignition of the motor vehicle is turned off.

12. The device according to claim 11, wherein the additional piece of data includes a temperature of the control unit.

13. The device according to claim 11, wherein the additional piece of data includes at least one of:

a maximum temperature of the control unit; and a duration of time for which a temperature of the control unit is greater than the maximum temperature.

14. The device according to claim 11, wherein the additional piece of data includes at least one of:

a minimum temperature of the control unit; and a duration of time for which a temperature of the control unit is less than the minimum temperature.

15. The device according to claim 11, wherein the additional piece of data includes at least one of:

a maximum voltage on a supply line coupled to the control unit;

a length of time for which a supply voltage applied on the supply line is greater than the maximum voltage; and a duration and intensity of interference voltages on at least one additional line coupled to the control unit.

* * * * *